United States Patent [19]

Moisan

[11] Patent Number: 4,520,586
[45] Date of Patent: Jun. 4, 1985

[54] AUDIBLE AND BI-VISUAL INDICATOR

[76] Inventor: Louis E. Moisan, 1920 N. Main St., Lancaster, Mass. 01523

[21] Appl. No.: 580,734

[22] Filed: Feb. 16, 1984

[51] Int. Cl.³ .............................................. A01K 97/12
[52] U.S. Cl. ....................................................... 43/17
[58] Field of Search ...................... 43/17, 15, 16, 17.5

[56] References Cited

U.S. PATENT DOCUMENTS

| | | | |
|---|---|---|---|
| 2,785,493 | 3/1957 | Thiel | 43/17 |
| 2,837,857 | 6/1958 | Ellison | 43/17 |
| 2,973,599 | 3/1961 | Olson | 43/17 |
| 3,078,610 | 2/1963 | Howell | 43/17 |
| 3,148,473 | 9/1964 | Miller | 43/17 |
| 3,199,241 | 8/1965 | Mauritz | 43/17 |
| 4,178,712 | 12/1979 | Williams | 43/17 |
| 4,250,649 | 2/1981 | Harrington | 43/16 |

Primary Examiner—Gene P. Crosby
Attorney, Agent, or Firm—Charles R. Fay

[57] ABSTRACT

A signal indicator to indicate a bite of a fish including a housing, a lamp, an audible signal, and a flag, all energized by a pop-up element tripped by the fish bite. The indicator can also be used with a conventional ice fishing tip up fishing device.

9 Claims, 5 Drawing Figures

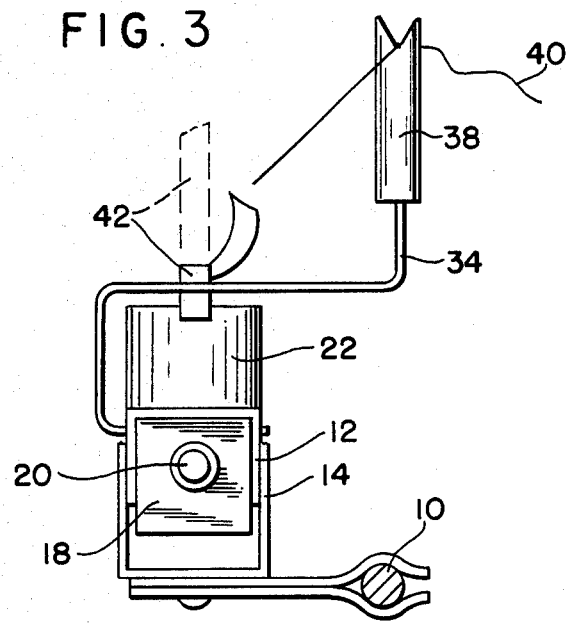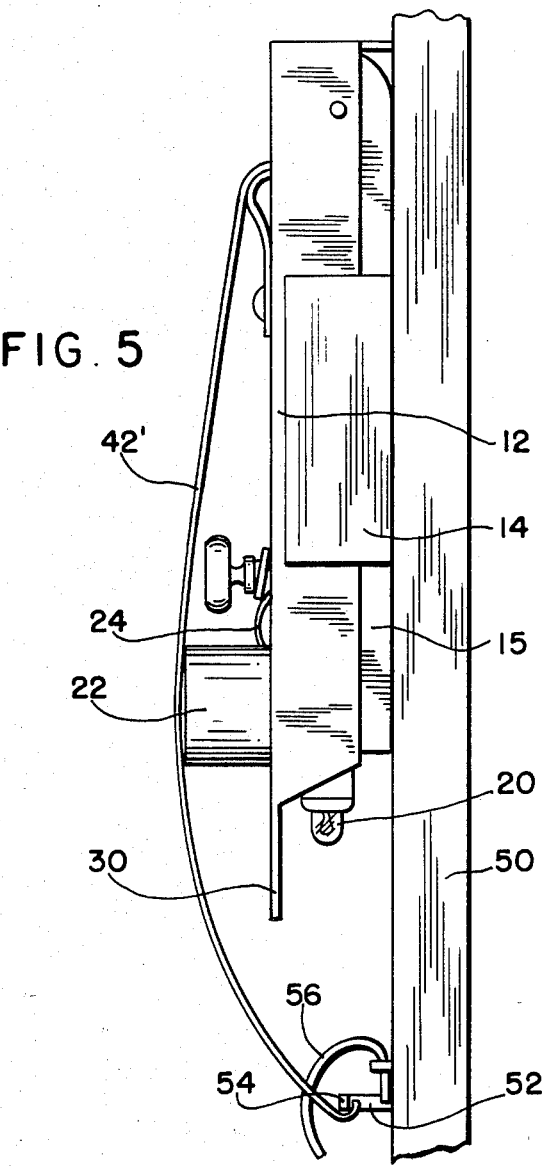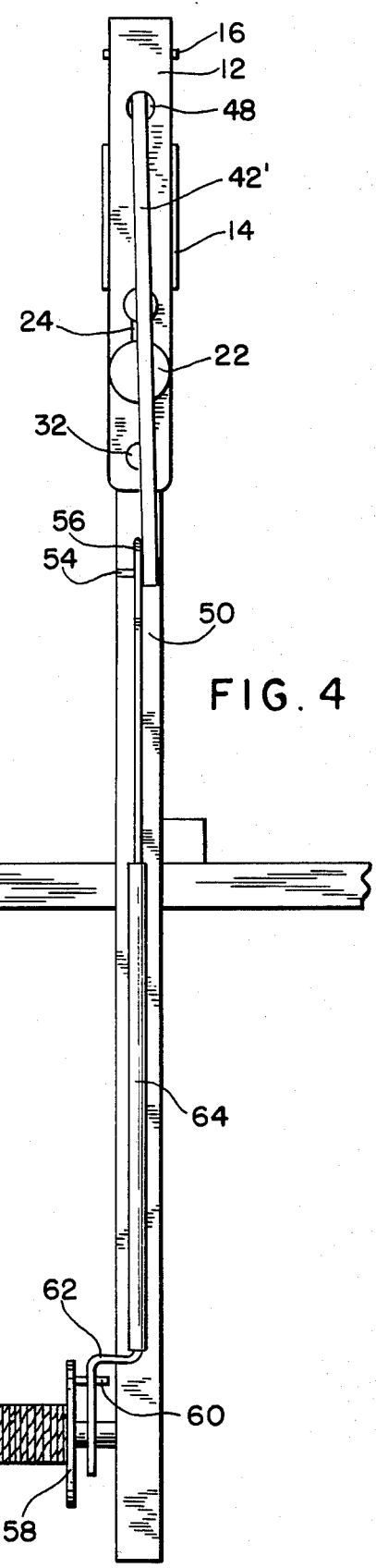

AUDIBLE AND BI-VISUAL INDICATOR

FIELD OF THE INVENTION

An indicator for fishing with a line including an audible signal, a light that flashes on, and a flag that snaps up from a position of comparative ineffectiveness to a position where it can be seen for several hundred feet under good conditions.

BACKGROUND OF THE INVENTION

The present fishing indicator invention is capable of being mounted on a fishing rod, ice fishing tip up, or on any solid support, in a matter of seconds and can easily be carried in a shirt pocket or tackle box. The novel indicator is very simple and rugged and can be manufactured inexpensively and may be used on the fishing rod or taken off the fishing rod if so desired and used elsewhere.

Also, there is no fraying of the line or drag or resistence. It has a housing preferably made of electricity conducting metal or, if made of plastic, it is provided with electrical energy conducting means to carry out the objects of the invention.

The above is a brief description of desirable attributes in a fishing indicator having particular reference to the simplicity and ruggedness thereof as well as the simple actuation and indicating mechanism.

SUMMARY OF THE INVENTION

This invention comprises a small, simple, rugged, elongated housing which will contain a battery and forms the base for a light bulb and also accepts an electrode for an audible signal which may be mounted on the outside of the housing. In the area of the battery, which requires a switch means of some kind to cause it to energize the audible signal and the bulb, there is an opening in the housing and mounted adjacent thereto there is one end of a resilient but deformable elongated ribbon doubled at one area into a hook-like member which extends through the opening into the housing adjacent the battery. The remainder of the ribbon is normally upright; that is, extends away from the housing due to its own resiliency and may carry the signal flag. When this erect portion of the ribbon is in such position, the hook engages the battery energizing the audible signal and the bulb, but when the erect portion is held down in close association with said housing as by means of a trip or the like, the hook portion thereof is removed from the battery and the audible signal and the bulb are de-energized.

The trip is actuated to release the ribbon to its erect condition and to energize the signals upon the action of a fish taking the lure and starting to swim off, there being a connection of the fishing line with respect to the trip so as to cause the same to react and then to release the line so that the fish may swim away, unwinding the usual reel.

BRIEF DESCRIPTION OF THE DRAWINGS

FIG. 3 is a front end view looking in the direction of the reel;

FIG. 4 is a front elevational view of a modification; and

FIG. 5 is a side elevational view of part of FIG. 4.

PREFERRED EMBODIMENTS OF THE INVENTION

Figure 1:
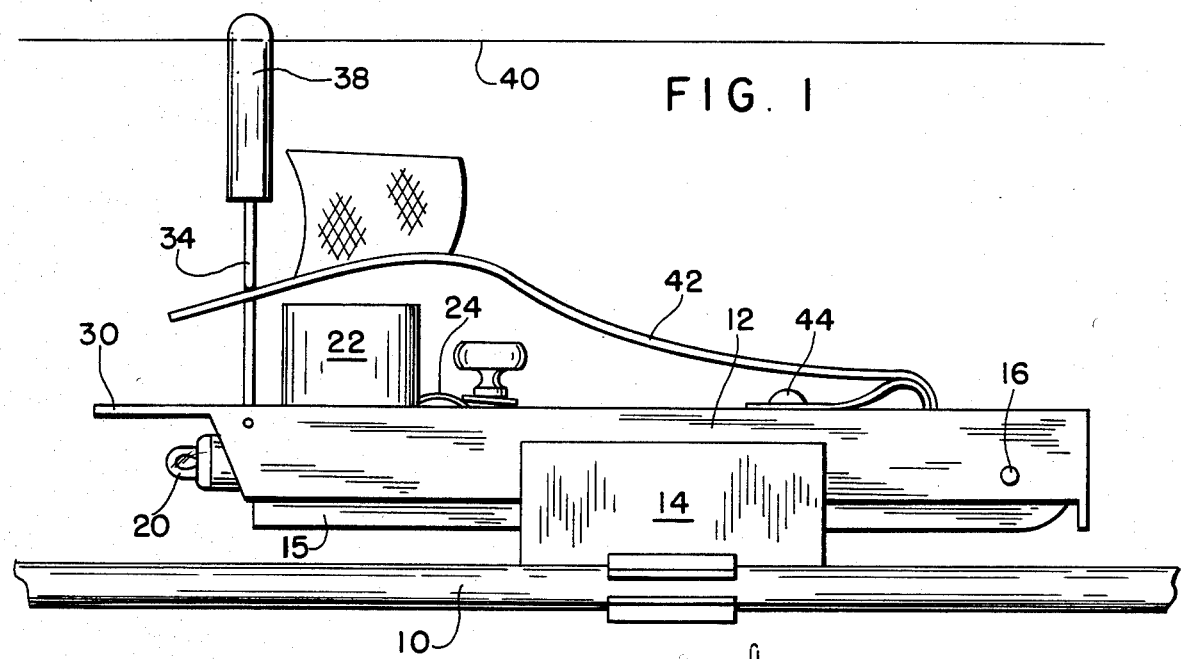
FIG. 1 is a view in side elevation of the new fishing indicator.

In FIG. 1, the reference character 10 indicates a fishing rod or other support for the new indicator which has a housing 12. This housing may be of electricity carrying material such as steel, aluminum, or plastic among others. A snap-in U-shaped bracket 14 receives the housing and is mounted as desired or convenient on the rod 10 or other support. In the present illustration, a bottom door 15 is pivoted to the housing at 16, and snaps thereinto. The housing is easily snapped on or off the bracket and the door is easily snapped open or closed or the housing may be easily snapped up to open it. The housing and door may be made as open bottom and open top nesting boxes.

Figure 2:
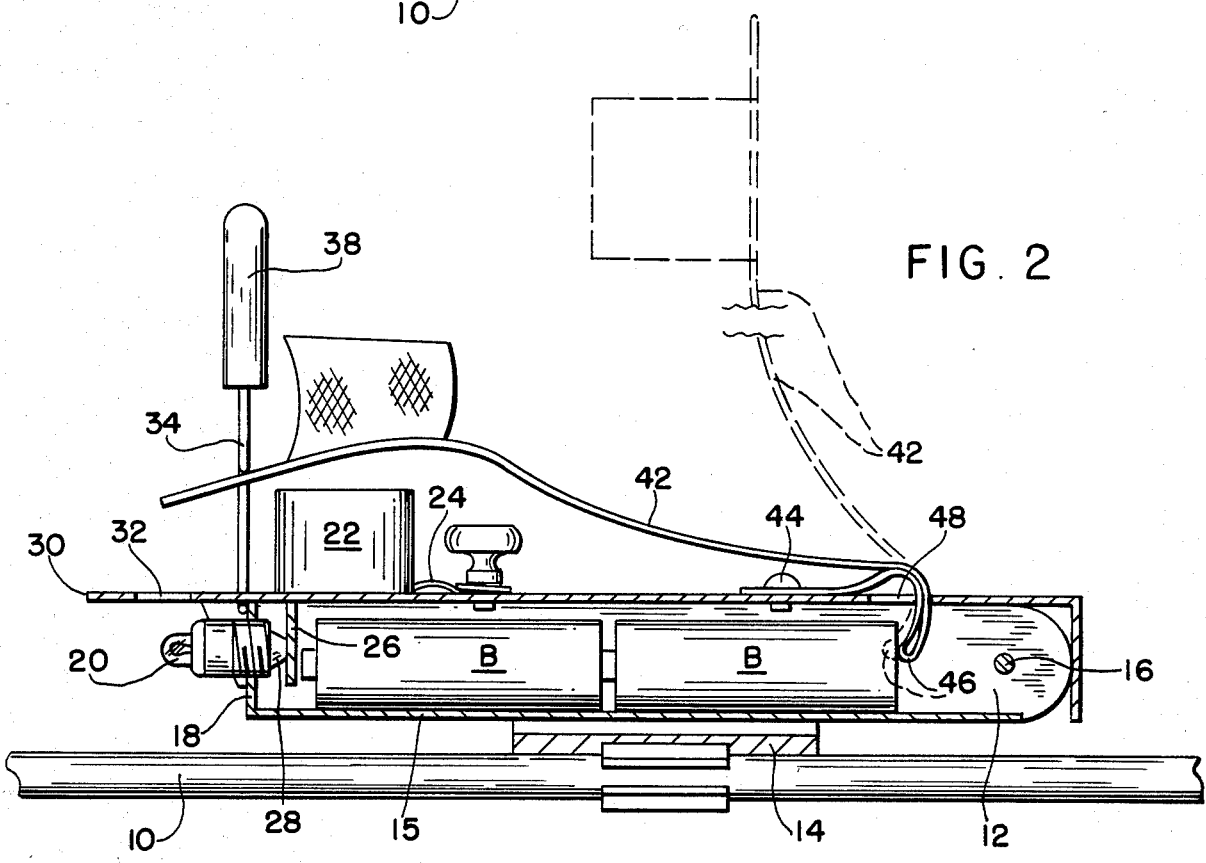
FIG. 2 is a longitudinal section thereof.

The door 15 has an end wall 18 in which is mounted a light bulb 20, grounded to its support. Otherwise the door is free and empty. The housing mounts an audible signal or buzzer 22 of commercial make, and it is grounded to the housing by a tongue 24 by which it may conveniently be attached to the housing. This signal has an energizing electrode 26 extending into the box in contact with the base 28 of the light bulb when the housing is closed, see FIG. 2. Preferably the housing has a plane extention 30 with a hole 32 in it for a view of the light from a direction at right angles to the housing, this housing being covered by a colored translucent material.

A pivoted trip 34 has a rubber-like tip 38 with a V in it to releasably hold the line 40. The line extends left in FIG. 1 to the lure and hook, and right to a conventional reel, FIG. 1, neither hook nor reel being shown as being well known in the art. One end of a resilient elongated element 42 is secured to the housing at 44. This elongated element 42 is doubled on itself adjacent to the fastening 44 and the doubled portion is bent into hook form as at 46, and this portion of element 42 passes through a hole 48 in the housing, the hook extending to a slight degree towards the light bulb, and battery or batteries B, B. The elongated resilient element 42 is preferably in the form of a ribbon of semi-resilient nature which is rather easily bent, doubled, and handled in general, but which retains its shape sufficiently for the purposes of this invention, once bent and doubled. It is especially pointed out that the elongated element has no pivot, but due to its nature, stands generally erect, see dotted lines in FIGS. 2 and 3, as a normal position in which the end of the hook 46 contacts and presses upon the battery base, thus energizing the signal 22 through electrode 26, and the light bulb 20 also through electrode 26 of signal 22. When not in use, the battery is removed, as it should be, to avoid wear and buildup.

The housing and everything with it may be placed on a rod of any type as stated, or may be placed on any convenient support such as a dock, raft, boat, etc. because the entire device is a unit. It may be placed on the upright member 50 of an ice fishing tilt or tip up, as in FIGS. 4 and 5. Preferably the light bulb 20 heads down to shine in the water over which the tip up is set but the apparatus is the same as above described, note housing 12, cover or door 15, light bulb 20, audible signal 22, etc. in FIGS. 4 and 5. However, resilient element 42' is slightly different as it has to be long enough to be set in the holder 52 having an offset 54 that is opensided. The end of the element 42' is held in this holder until the trip 56 is pivoted to push it free by a fish taking the lure on a line on reel 58. The latter has a finger 60 to engage offset 62 on spindle 64 to so release element 42' to move to normal position at a right angle to the housing just as recited above as to element 42. The reel 58, finger 60, spindle 64, holder 52, and trip 56 thereon are all old and well known in the art, but this illustrates how well the present invention accommodates to the usual tip up.

I claim:

1. An indicator comprising, a housing, a light bulb on the housing, a battery, means to mount the battery in the housing, an electric audible signal on the housing, electric grounds for said bulb and signal, an electrode for the audible signal, a spring in the form of an electric current-carrying, resiliently deformable, elongated element, means to secure said element at one end thereof to said housing, a portion of the elongated element adjacent said one end being in the general form of a hook movable under the influence of the resiliency of the element, said battery, bulb, and audible signal electrode being aligned, said hook portion of the elongated element having a normal position engaging the battery to energize the audible signal and bulb simultaneously thereby, said elongated element including a free end length normally substantially erect relative to the housing and capable of being bent down to a position close to the housing thereby moving the hook portion thereof out of engagement with the battery to de-energize the bulb and the audible signal, and a trip member to hold the elongated element temporarily in said de-energizing position, whereby upon release of the trip member from the elongated element, the latter assumes its erect position moving the hook portion thereof into engagement with the battery and energizing the bulb and signal.

2. The indicator of claim 1 wherein the elongated element is doubled to form the hook.

3. The indicator of claim 1 including a flag on the elongated element adjacent its free end.

4. The indicator of claim 1 wherein the elongated element point of securement to the housing is external of the housing, the hook passing through a hole in the housing to the interior thereof.

5. The indicator of claim 4 whereby the battery, audible signal electrode and bulb base are aligned, the hook having an end adapted to engage the base of the battery.

6. A fishing indicator comprising an elongated housing having an open side and three closed sides, a closure for the open side, a lamp bulb at one end of the closure mounted to cast an illumination parallel to the housing exteriorly thereof, and said bulb having a base in the housing, an electrically energized audible signal on the housing adjacent the lamp, an electrode therefor projecting into the housing to the lamp bulb base, a battery in the housing in cooperative relation to the electrode and thereby to the lamp, a pivoted trip adjacent the audible signal and the lamp, an aperture in the housing adjacent the end thereof remote from the lamp and near the end of the battery opposite the electrode and lamp, a resilient elongated element connected at one end to the housing adjacent the aperture, said resilient element having a free end adapted to be held down against its resilience by the trip but having a normal position extending up and away from the housing, a projection on said resilient element extending through the aperture into proximity to the base of the battery but spaced therefrom when held by the trip, but engaging the base of the battery when the element is released to energize the audible signal and lamp, means operating the trip and holding a fishing line so that the trip releases the resilient element upon a strike by a fish.

7. The fishing indicator of claim 6 wherein the elongated resilient element is long enough to be held and released by a conventional trip of a conventional ice fishing tip up.

8. The fishing indicator of claim 7 wherein the housing is mounted on an upright of the conventional tip up parallel thereto with the lamp bulb facing down.

9. The fishing indicator of claim 6 wherein the resilient elongated element is doubled on itself in one area to form the projection.

* * * * *